(12) United States Patent
Grenzi (10) Patent No.: US 8,113,597 B2
(45) Date of Patent: Feb. 14, 2012

(54) TRACK JOINT SEAL SYSTEM

(75) Inventor: Francesco Grenzi, Ferrara (IT)

(73) Assignee: Berco S.p.A., Copparo Ferrara (IT)

( * ) Notice: Subject to any disclaimer, the term of this patent is extended or adjusted under 35 U.S.C. 154(b) by 245 days.

(21) Appl. No.: 12/449,163

(22) PCT Filed: Dec. 21, 2007

(86) PCT No.: PCT/IB2007/004130
§ 371 (c)(1),
(2), (4) Date: Aug. 21, 2009

(87) PCT Pub. No.: WO2008/093160
PCT Pub. Date: Aug. 7, 2008

(65) Prior Publication Data
US 2010/0090523 A1  Apr. 15, 2010

(30) Foreign Application Priority Data
Jan. 30, 2007  (IT) ................. MI2007A0147

(51) Int. Cl.
*B62D 55/88* (2006.01)
(52) U.S. Cl. ......... 305/104; 305/106; 305/202; 277/381
(58) Field of Classification Search .................. 305/100, 305/103, 104, 105, 106, 200, 202, 203, 204; 277/377, 381, 382
See application file for complete search history.

(56) References Cited

U.S. PATENT DOCUMENTS

| | | | | |
|---|---|---|---|---|
| 2,599,034 A * | 6/1952 | Wilkinson | ..................... | 277/377 |
| 3,392,984 A * | 7/1968 | Reinsma et al. | ............... | 277/380 |
| 3,480,338 A * | 11/1969 | Burk et al. | ..................... | 305/103 |
| 4,295,654 A * | 10/1981 | Kawamura et al. | ........... | 277/380 |
| 4,819,999 A * | 4/1989 | Livesay et al. | ................ | 305/103 |
| 5,826,884 A * | 10/1998 | Anderton et al. | ............. | 277/396 |
| 6,102,408 A | 8/2000 | Anderton | | |
| 6,105,969 A | 8/2000 | Anderton | | |
| 6,846,051 B2 * | 1/2005 | Bottom et al. | ................. | 305/202 |
| 7,597,410 B2 * | 10/2009 | Mulligan et al. | .............. | 305/103 |
| 7,845,740 B2 * | 12/2010 | Dahlheimer | .................. | 305/102 |

FOREIGN PATENT DOCUMENTS

| | | | |
|---|---|---|---|
| EP | 185336 | A2 * | 6/1986 |
| EP | 0 953 497 | A | 11/1999 |

OTHER PUBLICATIONS

PCT Search Report Dated Apr. 11, 2008.

* cited by examiner

*Primary Examiner* — Kip T Kotter
(74) *Attorney, Agent, or Firm* — Hedman & Costigan; James V. Costigan (57) ABSTRACT

A track joint seal system comprises a pin (43) having, at each end, a first track link (41) rotatably coupled to the pin by means of interposition of a bushing (49) and an end element (42) coupled to the end of the pin (43); the end element (42) comprises an annular seat (57) bearing, housed, a seal group (56) cooperating with the bushing (49) to make the sealing of the joint; the bushing (49) is provided at the end with an annular head seat (58), provided to house a bushing insert (53) provided with an abutment surface (48) destined to be in contact with a seal portion (47) of the seal group (56).

10 Claims, 9 Drawing Sheets

TRACK JOINT SEAL SYSTEM

The present invention refers to a track joint seal system for tracked vehicles.

The tracks of a tracked work vehicle generally comprise a pair of parallel chains wherein each chain is made by means of a continuous sequence of articulated joints of hinge type, connected to each other and maintained at a constant distance by means of appropriate rigid connection members called track links.

The tracks also comprise a plurality of bushings and pins interposed between the links to connect their ends, so to form the chains.

The supported track links and bushings cooperate with each other to form a plurality of track joints which permit the necessary rotational movement between adjacent track links.

This permits the articulation of the adjacent track links when the track rotates, wound around the wheels of the track means.

The rotation of the track permits the tracked machinery to move on the ground, so to carry out the many operations for which it is intended.

The track joints are typically equipped with a seal system, which has the object of keeping out corrosive and abrasive mixtures of water, dirt, sand, stone or other mineral or chemical elements to which the chain is exposed during its use.

The seal system has the function of holding a lubricant inside the chain joint in order to facilitate the relative articulation movement of the track links.

The abovementioned functions are generally carried out by means of a frontal seal system obtained through seal elements arranged within the housing of the track link and having seal portions which push against the end surfaces of the respective bushings.

Seal systems according to the prior art are illustrated in end section in FIGS. 1-5, moreover a seal device of this type forms the object of the European patent EP0953497 (corresponding to U.S. Pat. No. 6,176,491) in the name of the Applicant.

Figure 1:
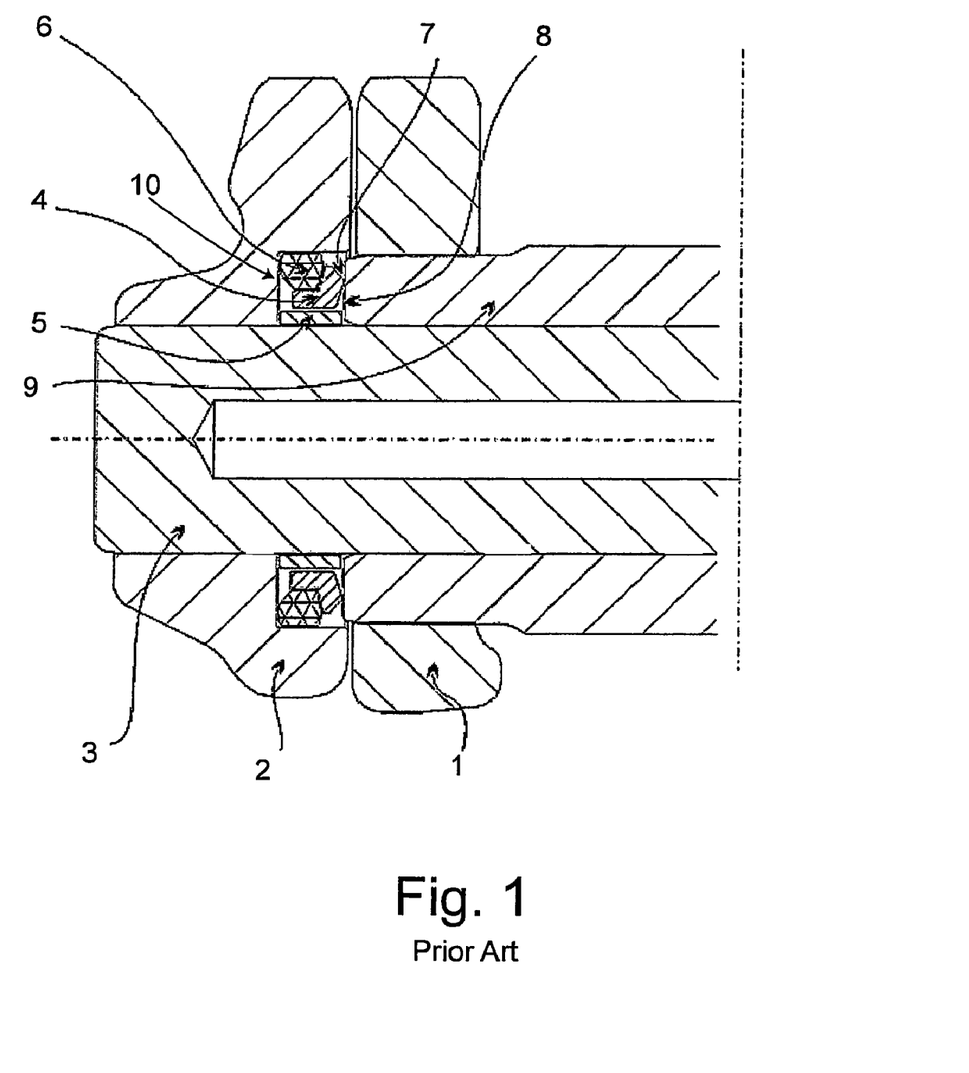
FIG. 1-5 illustrate, in partial schematic section, one end of as many track joints according to the prior art.

In particular, FIG. 1 shows an example of a joint type according to the prior art.

The illustrated track joint comprises two track links 1 and 2 which are interconnected with a pin 3 and a seal system 10.

The seal system 10 comprises a bushing 9 which is coaxially inserted on the pin and seal set, at each end of the pin, in turn comprising a resilient seal ring 4, a spacer ring 5 and a preloaded contact ring 6.

Figure 2:
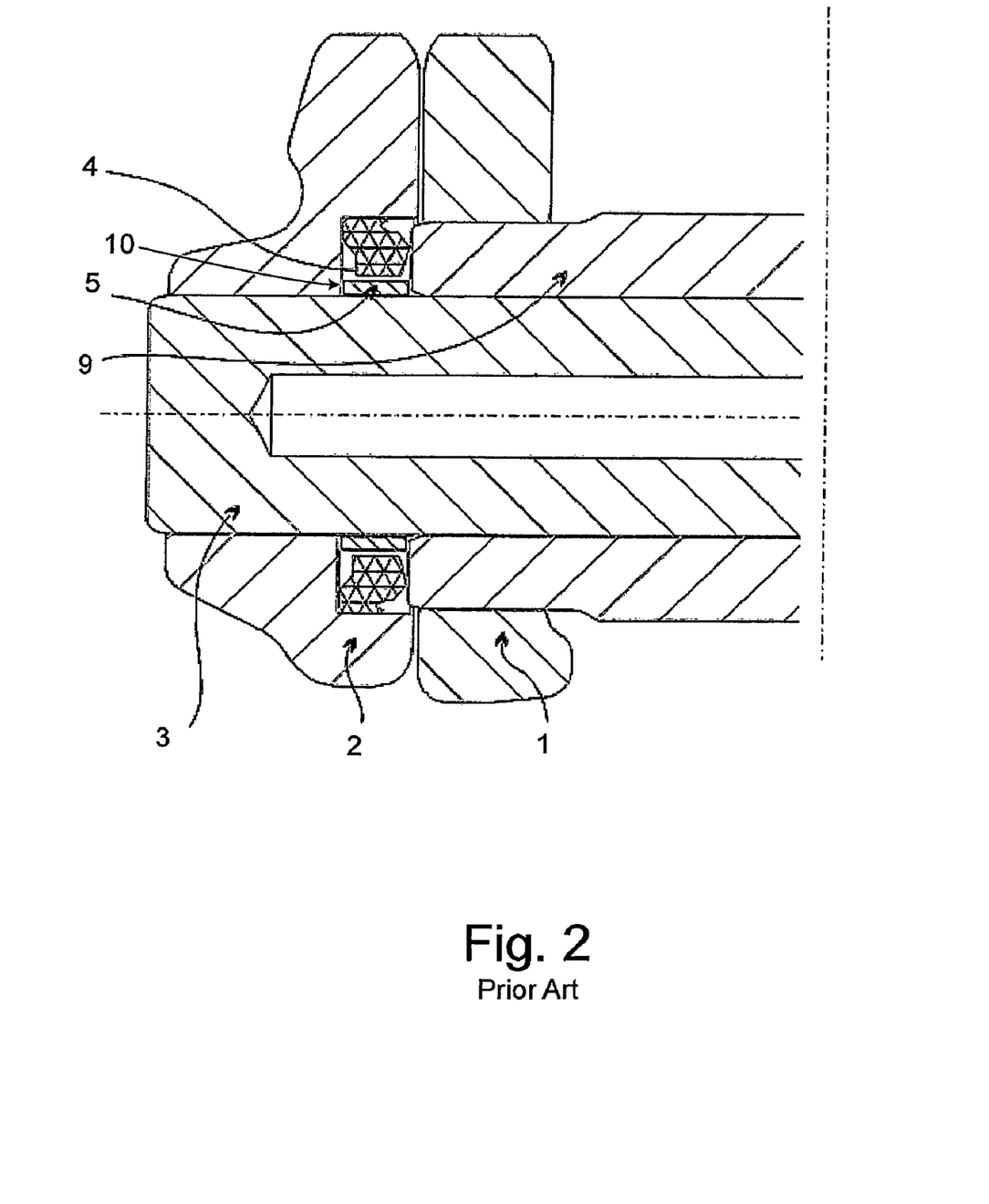

With reference to FIG. 2, the seal system 10 can also be made with a bushing 9 and a seal set comprising a single resilient seal 4 and a spacer ring 5.

In both cases, from the seal ring 4 there extends a seal lip 7, provided for the contact with the end surface 8 of the bushing 9.

Another way to make the joint seal is by means of providing for an extended contact surface; such embodiment forms the object of the European patent EP0953497 (corresponding to U.S. Pat. No. 6,176,491) in the name of the Applicant, exemplified in FIG. 3.

Figure 3:
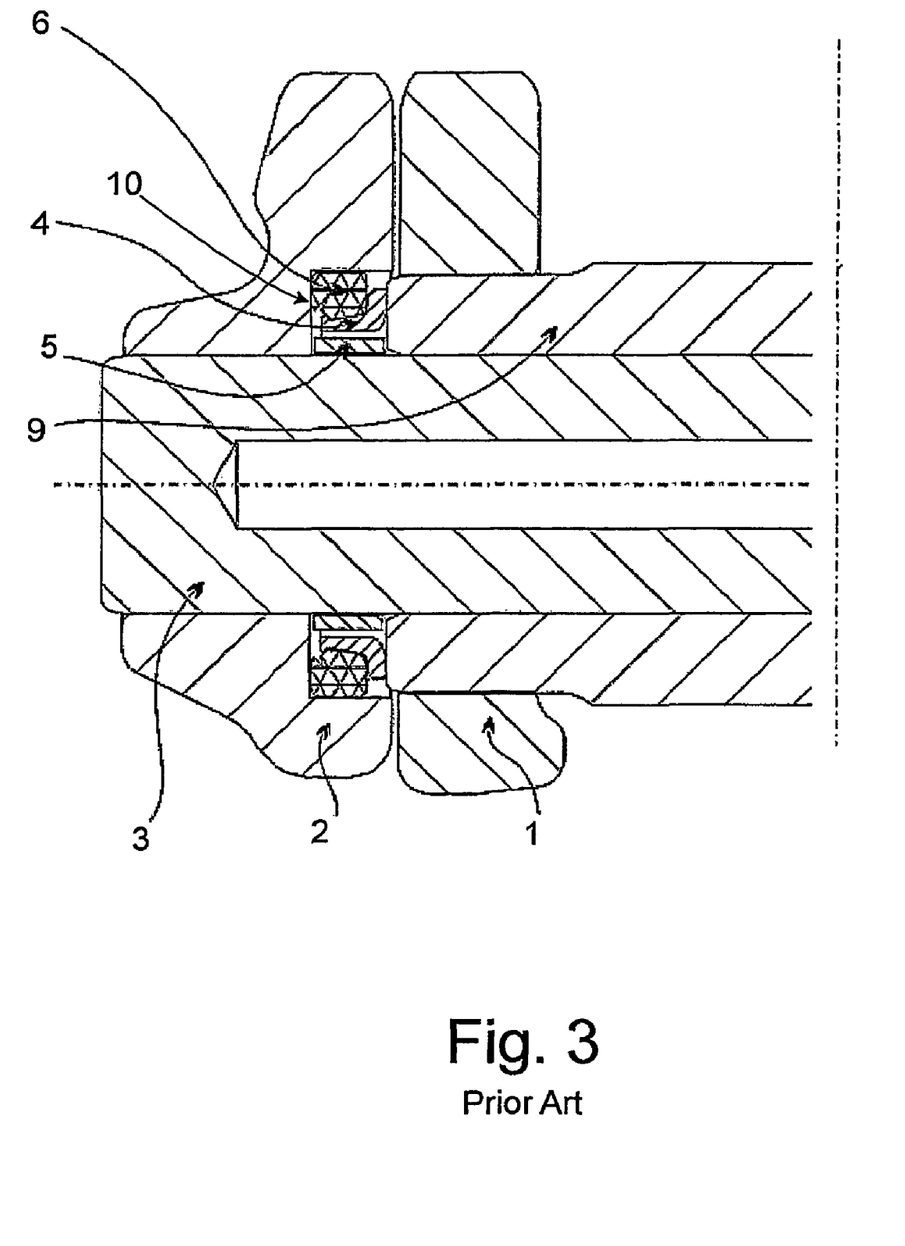

In this case, the seal ring 4 is rigid and not resilient as in the case of the lip seals.

The seal system 10 comprises also in this case a seal system composed of a seal ring 4 in contact with the bushing end 9, a spacer ring 5 and a preloaded ring 6.

The track links 1 and 2 are joined, through the pins 3 and the bushings 9, to the adjacent joints (not shown) in order to create a chain for machinery of tracked type.

Figure 4:
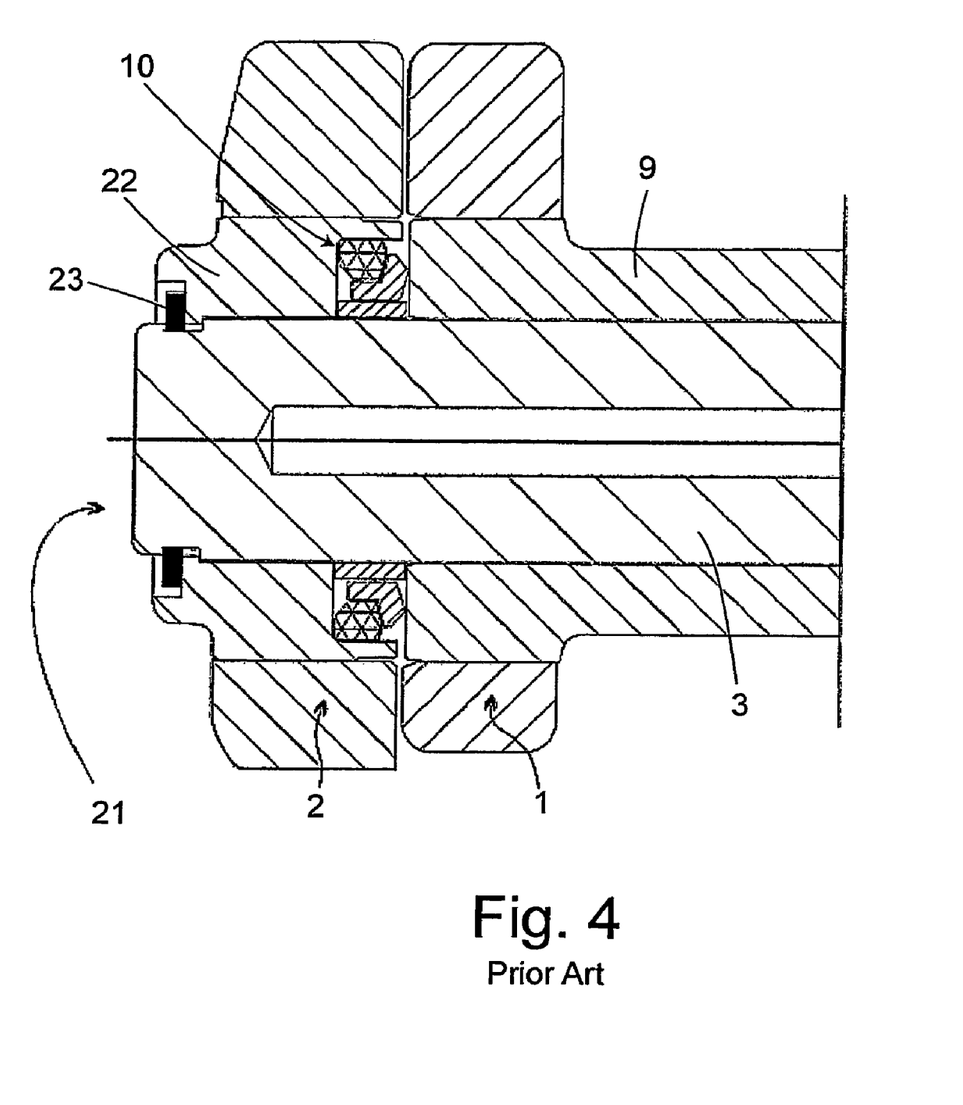
Figure 5:
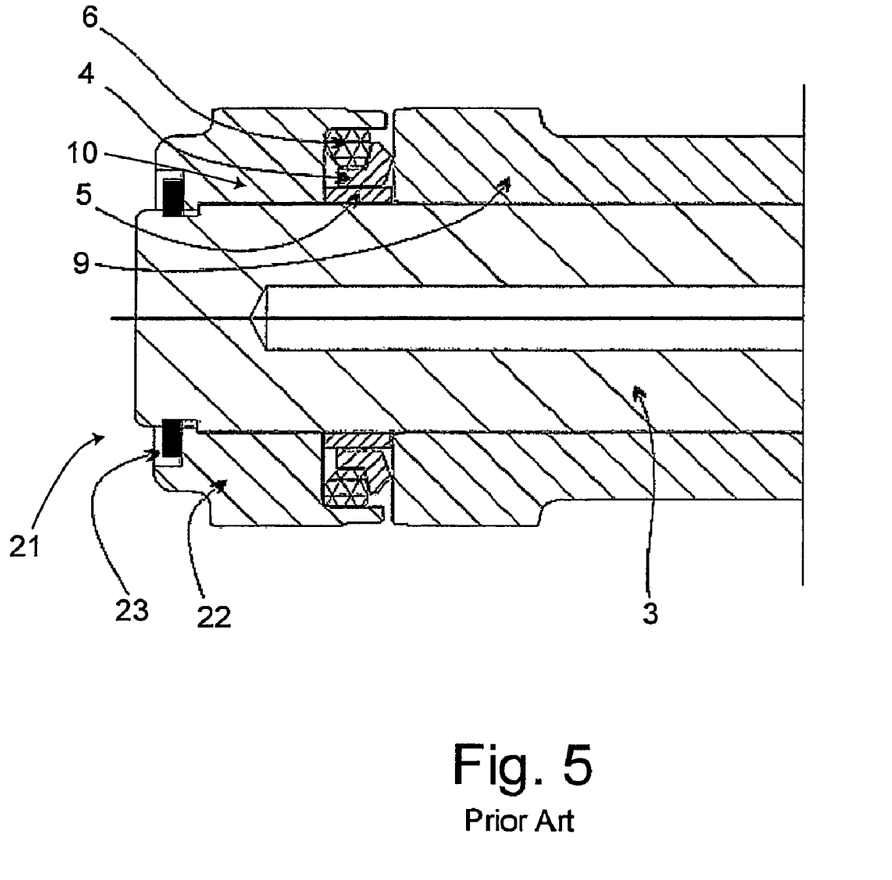

The chain for tracked machines can also be made with the use of cartridges as illustrated in FIGS. 4 and 5.

The illustrated cartridge set 21, with regard to one of the two ends of the pin, comprises a bushing 9, a pin 3, a collar 22 and a seal system 10, in exemplifying schematic form in FIGS. 4 and 5.

The cartridge can be held in axial direction with the collar 22 on both sides of the cartridge.

The collar 22 can be connected to the pin 3 with a seal ring 23, with insertion by interference or by means of welded joint.

The cartridge is particularly adapted for being inserted inside the overlapping track links 1 and 2 to create a chain joint.

The advantages of the aforesaid cartridge system are numerous, including the fact that the aforesaid cartridge is self-contained, providing all of the essential functions of seal and support required by the chain joint set; in addition, if needed, it can be easily repaired by removing the old, worn cartridge 21 and substituting it with a new cartridge 21.

Removing and substituting the entire cartridge set 21 to repair the chain joint is more economical and effective with respect to the normal practice of substituting every single piece of the chain joint.

Nevertheless, even with such system, the problem of excess or frequent wear of the track sets remains unresolved.

The Applicant, in addressing the problem of extending the operational lifetime of a track joint, has found that this operational lifetime is directly connected to the integrity of the bushing, from which the lifetime of the entire seal system consequently depends, as well as that of the joint and hence the tracks.

The main cause of failure of the seal systems according to the prior art is due to the wear of the end surface of the bushing subjected to the scraping contact of the lip or portion of the seal, by relative rotation of the parts.

This contact can generate grooves in the end surface of the bushing.

If such grooves become sufficiently deep, the integrity of the seal system is compromised and external abrasive and corrosive particles can enter in the joint.

These grooves are also responsible for the loss of lubricant contained inside the chain joint.

The aforesaid problems can quickly cause the deterioration of the joint integrity and thus also of the integrity chain itself.

The Applicant was able to resolve the aforesaid problem by means of a seal system adapted to preserve the integrity of the end surface of a track joint bushing for a long time.

The characteristics and advantages of the track joint seal system according to the present invention will be more evident from the following exemplifying and non-limiting description referred to the attached schematic drawings, in which.

With reference to FIGS. 6-9, an end portion is illustrated of a chain joint of tracks of a tracked vehicle.

Such chain joint is substantially symmetrical with respect to the mid-plane of the pin, so that the elements identified are also present at the end of the pin opposite that shown as example.

The chain joint comprises a first track link 41 and an end element 42 coaxially interconnected by means of a substantially cylindrical pin 43 having longitudinal axis 54.

Figure 6:
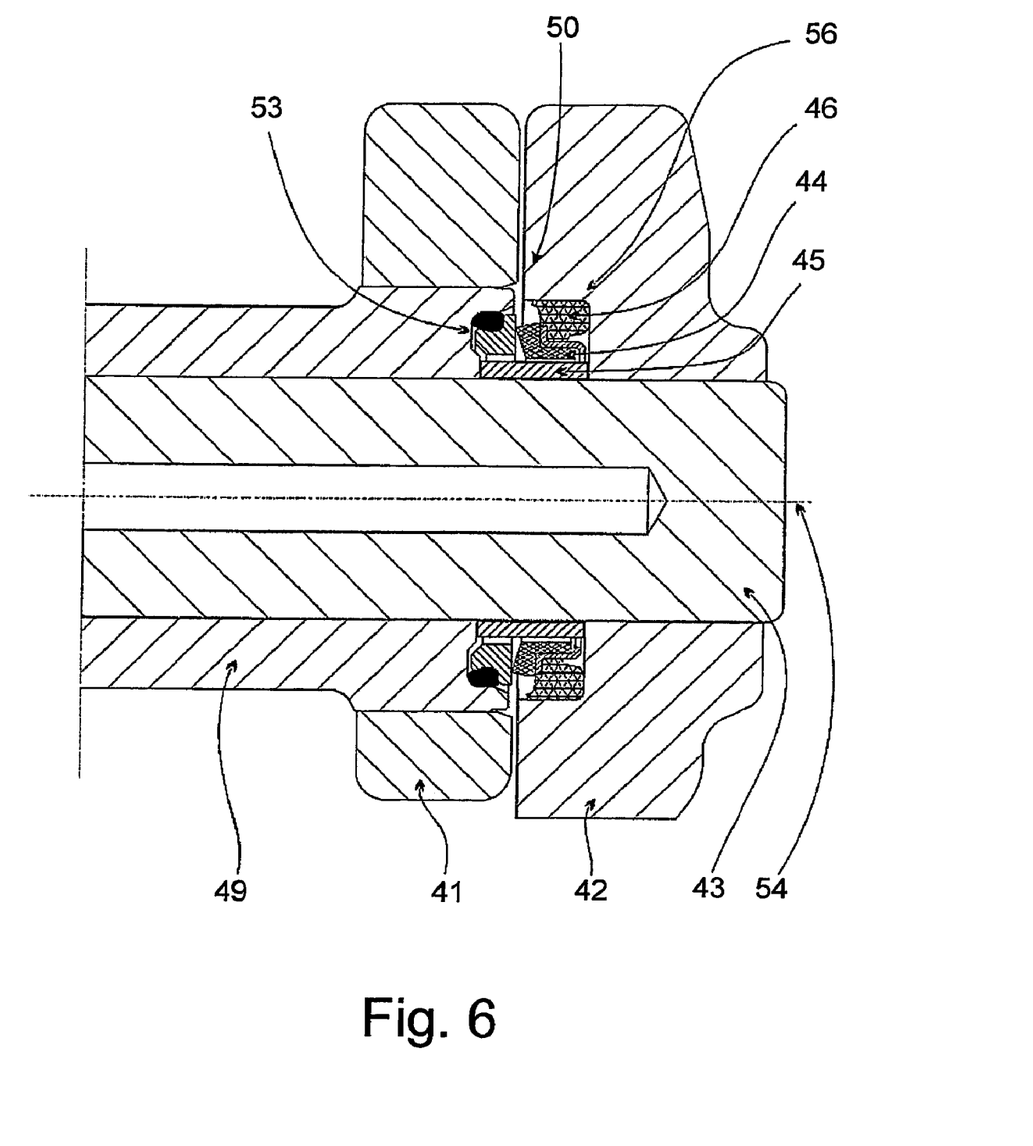
FIG. 6 illustrates a partial schematic end section of a track joint equipped with the seal system according to the invention.
Figure 7:
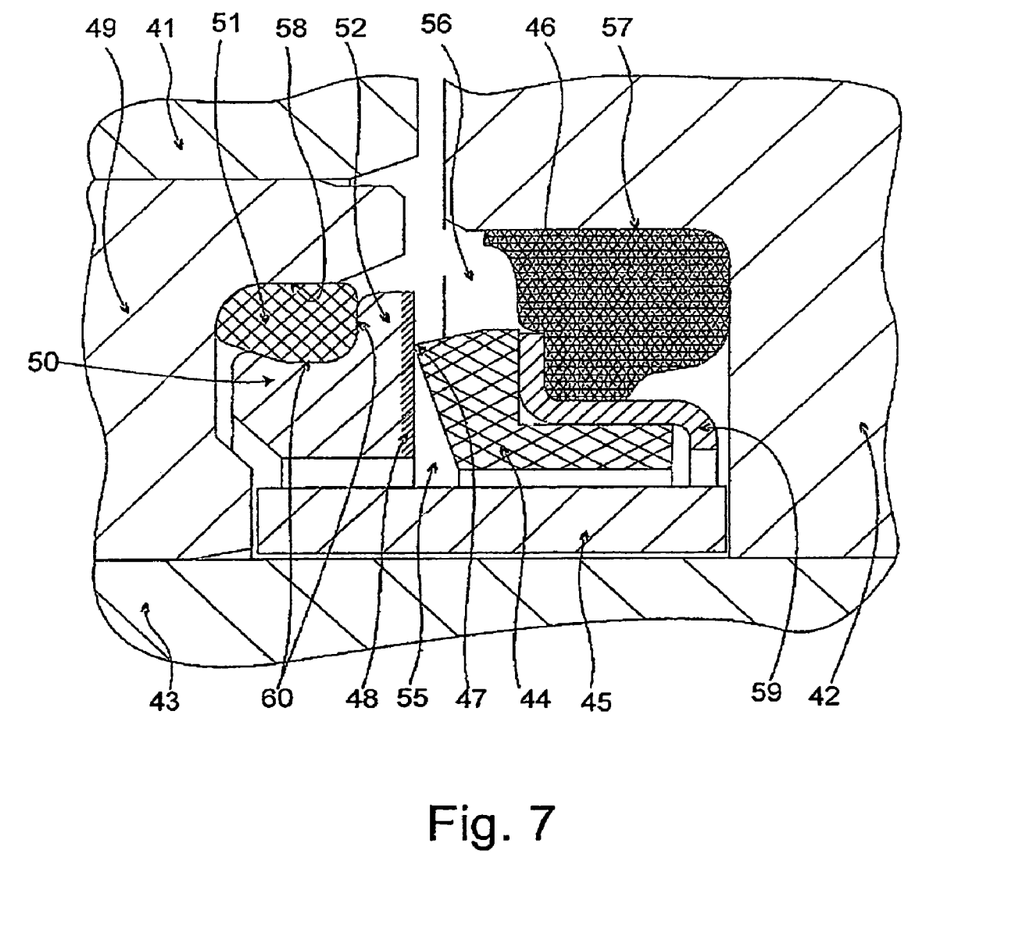
FIG. 7 illustrates an enlarged detail of the seal system of FIG. 6.
Figure 8:
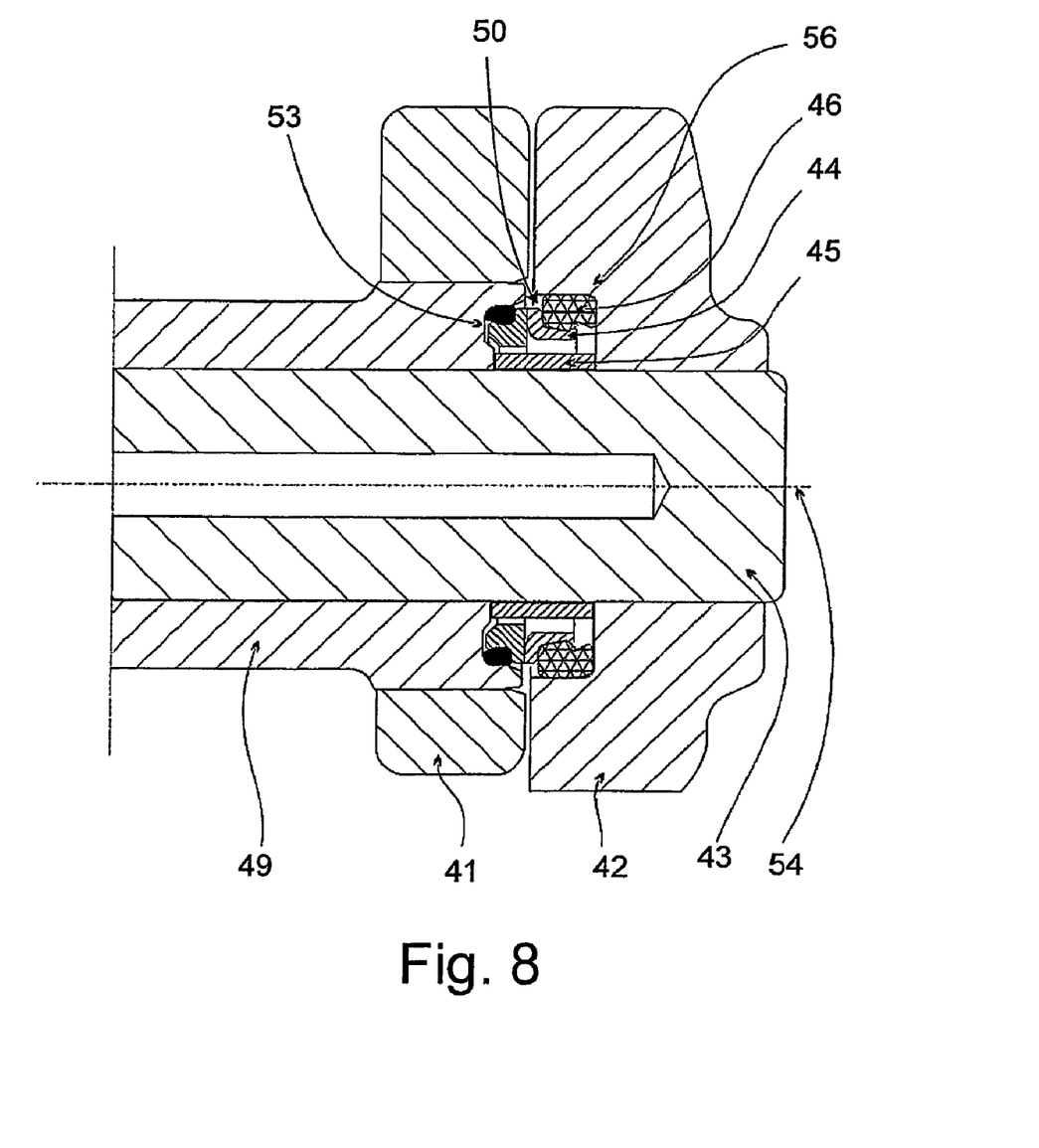
FIGS. 8 and 9 illustrate, in partial schematic end section, as many track joint embodiments equipped with seal systems according to the invention.
Figure 9:
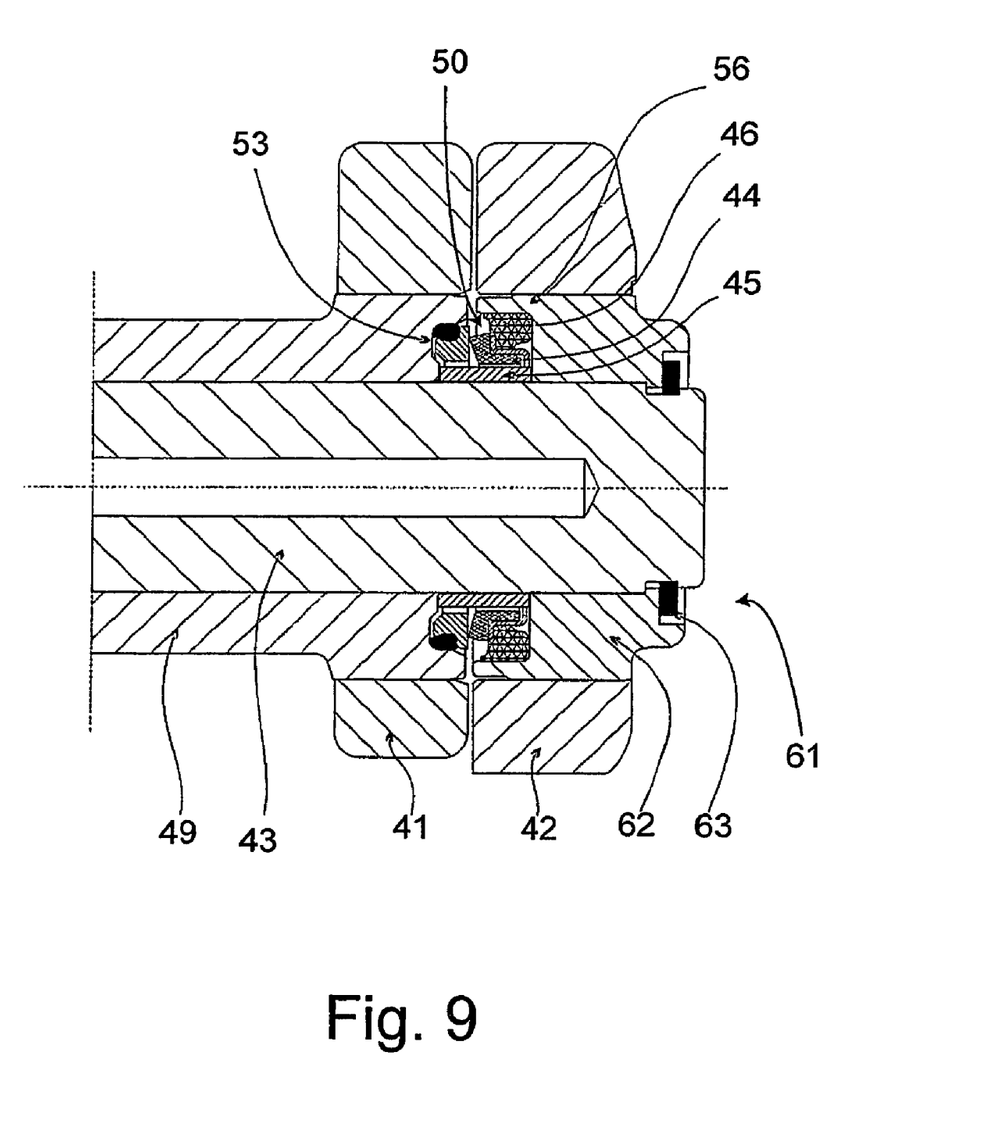

With particular reference to the embodiments of FIGS. 6-8, the end element assumes the configuration of a second track link 42, while with reference to the embodiment of FIG. 9 such end element has the form of a collar 62 on which the second track link 42 is coupled.

The track links 41 and 42 are connected with the joints of the adjacent chains (not shown) to create a chain for the tracked machines.

Returning to FIGS. 6-8, a second track link 42 is coupled with interference to each end of the pin 43 as end element, while a corresponding first track link 41 is rotatably coupled to the pin 43 internally, near the end of the pin by means of the interposition of a bushing 49, in turn coupled with interference to the first track link 41, the bushing 49 being coaxially inserted on the pin 43.

The second track link 42 has an annular seat 57 made centrally on the inner surface of the track link 42, so to face the first track link 41 upon completed assembly. Such seat 57 is foreseen for housing a seal group 56 destined to cooperate with the bushing 49 in order to make a seal system 50 of the joint.

According to the embodiments illustrated in FIGS. 6 and 7, the seal group 56 comprises a seal ring 44 assembled concentrically on a spacer ring 45 placed directly in contact with the pin 43 and a preloaded ring 46 arranged concentrically outside the seal ring 44 and in contact with the wall of the seat 57 to maintain the seal ring compressed.

The seal ring 44 can moreover be provided with a metal core 59 to make it more rigid and the preloaded ring 46 can be integrated in the seal ring 44 or separated from the latter.

The preloaded ring 46 is preferably made of a resilient material.

The seal for the sealing of the joint is obtained due to the cooperation of the seal group 56 with an abutment surface 48 of a bushing insert 53 housed within an annular head seat 58 made at the end of the bushing, so to face the seat 57 of the second track link; a lubrication chamber 55 is defined between seal group and abutment surface.

In particular, a seal portion 47 in lip or surface form is axially extended towards the inside of the joint from the seal ring 44, in order to create a seal contact with the abutment surface 48 of the bushing insert 53.

The bushing insert 53 comprises a rigid insert 52 circumferentially positioned in the annular seat 58 on the spacer 45 and an elastic ring 51, concentric to and superimposed on the rigid insert 52 and destined to circumferentially contact the seat 58 in order to generate the necessary compression thrust on the rigid insert.

The bushing insert 53 is positioned concentrically to the rotation axis 54 inside the housing 58 of the bushing 49.

In order to ensure the retention of the lubricant in the lubricant chamber 55 and to prevent the entrance of abrasive and corrosive particles from the outside, the seal ring 44 is in dynamic seal coupling with the abutment surface 48 of the rigid insert 52 and simultaneously the elastic ring 51 is in static seal coupling with the housing 58 provided in the bushing 49.

The elastic ring 51 is then compressed between the housing 58 and the rigid insert 52, both radially and axially.

The radial axial pressure exerted by the elastic ring 51 on the rigid insert 52 permits centring the insert concentrically along the rotation axis 54.

The axial pressure exerted by the elastic ring 51 on the rigid insert 52 serves to maintain constant the contact between the seal 44 and the abutment surface 48 of the rigid insert 52, even in the presence of collisions or vibrations typical in the use of tracked machines.

The combined axial and radial pressures exerted by the elastic ring 44 prevent the rotation of the bushing insert 53 in relation to the housing 58.

The elastic ring 51 can be integral or non-integral with the rigid insert 52 in order to support the rigid insert 52 in static seal coupling with the housing 58.

The rigid insert 52 preferably has a substantially "L"-shaped section so to create on one side the abutment surface 48 and on the other a housing 60 for the elastic ring 51.

The abutment surface 48 of the rigid insert 52 is preferably hardened by means of heat treatment (generally preferably quenching and tempering of the material of the rigid insert 52) or is covered by a hardening single or multi-layer plasma cover which permits increasing the hardness level at least to Rockwell HRC 65 hardness values in the case of heat treatment of the alloy cast iron and at least to Vickers HV 900 hardness values (equal to HRC 67) in the case of surface covering.

The typical bushings for lubricated chains are instead constructed in "cementation" steel with low cemented carbon level, are quenched and extended.

After the heat treatment, HRC 58-62 hardness is generally reached at the surface of the cemented piece, while at the core, with low carbon level and hence little sensitive to the hardening effect of the quenching, there is ductility and toughness together with considerable strength.

It is very important to maintain this surface hardness and toughness combination at the core, which give rise to a high resistance to wear, an increased lifetime with fatigue and capacity to resist peak stresses, which are frequent in tracked machinery.

The increase of the operational lifetime, i.e. the resistance to wear of the seal system, is made according to the present invention by substituting the end surface of the bushing with an additional element, the bushing insert, which has a harder surface with respect to the hardness obtainable on the final surfaces of the bushings produced with the traditional method.

The rigid insert 52 substitutes the contact surface of the bushing with a harder surface provided on one side of this rigid insert.

The rigid insert is preferably made with one or more of the following materials:
  Corrosion-resistant alloy cast iron, for example, alloy cast iron with high chromium content, chromium-molybdenum alloy cast iron and nickel-chromium alloy cast iron and the like which due to the hardening heat treatment reaches a hardness equal to HRC 65 on the contact surface;
  Steel hardened with heat treatment and with an additional single or multi-layer plasma cover on the contact surface which permits increasing the surface hardness level to Vickers hardness levels of at least HV900;
  Cemented or quenched steel.

The elastic ring 51 has the function of sealing the joint between the bushing insert 53 and the bushing housing 58 and to maintain the continuous contact of the contact surface of the bushing insert 53 with the seal lip or surface 47.

This function is exerted by a compression of the elastic ring between the bushing insert and the seal itself.

The elastic ring can have a circular or rhomboid section in relation to the shape of the bushing housings and to the shapes of the bushing insert.

The material of the elastic ring is preferably an elastomer capable of creating a necessary seal compression force and to continuously maintain this force in the presence of oil, water, sand and particles in general at various temperatures and/or with collisions and/or vibrations.

The roughness of the abutment surface 48 of the rigid insert 52 is prearranged in relation to the material of the ring 44 in contact with the insert 52, generally surface finishing is preferred with average value Ra in the range of 0.2-0.4 micrometers, obtained by means of lapping.

The spacer ring 45 can be free to be positioned on the pin 43 between the second track link 42 and the bushing 49, so to limit the minimal axial clearance between them.

The bushing insert 53 according to the present invention can be used in combination with a rigid surface seal ring like that according to the European patent EP0953497 in the name of the Applicant or more in general with conventional seal groups which provide a seal portion operating in contact with the end surface of the bushing.

As can be seen in FIG. 9, the seal system 50 can be installed inside a cartridge set 61 and comprises, analogous to the preceding embodiments, the bushing 49 equipped with bushing insert 53 already described according to the invention, the pin 43, a collar 62 and the seal group 56 housed within a seat 57 made centrally on the inner surface of the cartridge 61, which in this embodiment acts as end element bearing the seal group in central position in an entirely similar manner to the seal group made in the second track link 42 when this is directly engaged on the pin 43.

The cartridge can be held in axial direction by the collars 62 on both sides of the cartridge itself.

The collar 62 can be connected with the pin 43 by an elastic safety ring 63, by interference or by means of welding joint.

The cartridge is adapted to be inserted as a rotating connection between the track links 41 and 42, in this case the second track link 42 is engaged on the collar 62.

The invention claimed is:

1. Track joint seal system comprising a pin (43) having, at each end, a first track link (41) rotatably coupled to said pin (43) by means of interposition of a bushing (49) and an end element (42) engaged at the end of said pin (43), said end element (42) comprising an annular seat (57) housing a seal group (56) cooperating with said bushing to make the sealing of the joint, wherein at each end of said bushing (49) an annular head seat (58) is made, provided for housing a bushing insert (53) provided with an abutment surface (48) destined to be in contact with a seal portion (47) of the seal group (56), said bushing insert (53) comprising a rigid insert (52) circumferentially positioned in the annular head seat (58) and an elastic ring (51) concentric to and superimposed on the rigid insert (52) and destined to circumferentially contact the annular head seat (58) in order to generate the necessary compression thrust on the rigid insert (52), said elastic ring (51) being made either integral or non-integral with the rigid insert (52) to support the rigid insert (52) in static seal coupling with the annular head seat (58), and wherein said rigid insert (52) has a substantially "L" shaped section designed to create, on one of its sides, the abutment surface (48) and on the other side of the "L" shaped section, a housing (60) for the elastic ring (51) when said elastic ring (51) is made non-integral with the rigid insert (52).

2. Track joint seal system according to claim 1, wherein said bushing insert (53) is positioned concentrically to the longitudinal rotation axis (54) of the pin (43) inside the housing (58) of the bushing (49).

3. Track joint seal system according to claim 2, wherein said seal group (56) comprises a seal ring (44) assembled concentrically on a spacer ring (45) placed directly in contact with the pin (43) and a preloaded ring (46) arranged concentrically outside the seal ring (44) and in contact with the wall of the annular seat (57) to maintain the seal ring compressed.

4. Track joint seal system according to claim 3, wherein said seal portion (47) of the seal group (56) and said abutment surface (48) in contact define a lubrication chamber (55) between them with the seal ring (44) in dynamic seal coupling with the abutment surface (48) of the rigid insert (52) and simultaneously the elastic ring (51) in static-seal coupling with the annular head seat (58) provided in the bushing (49).

5. Track joint seal system according to claim 1, wherein said rigid insert (52) is made of one or more materials chosen from:
   (a) corrosion-resistant alloy cast iron, alloy cast iron, alloy cast iron with high chromium content,
   (b) chromium-molybdenum alloy cast iron and nickel-chromium alloy cast iron;
   (c) steel hardened with heat treatment; and
   (d) cemented or quenched steel.

6. Track joint seal system according to claim 5, wherein said abutment surface (48) of the rigid insert (52) is hardened by means of heat treatment or is covered with a hardening single or multi-layer plasma cover which permits increasing the hardness level at least to Rockwell HRC 65 hardness values in the case of heat treatment of the alloy cast iron and at least to Vickers HV 900 hardness values in the case of surface covering.

7. Track joint seal system according to claim 6, wherein the abutment surface (48) of the rigid insert (52) is made with surface finishing with average roughness value Ra in the range of 0.2-0.4 micrometers, obtained by means of lapping.

8. Track joint seal system according to claim 5, wherein said elastic ring (51) has a circular or rhomboid section in relation to the shape of the annular head seat (58) of the bushing (49) housings and to the shapes of the bushing insert (53) and is made of elastomeric material.

9. Track joint seal system according to claim 1, wherein said end element (42) is a second track link which can be engaged directly on the pin (43).

10. Track joint seal system according to claim 1, wherein said end element (42) is a collar (62) of a cartridge set (61), a second track link being engageable on said collar (62).

* * * * *